United States Patent Office 3,247,146
Patented Apr. 19, 1966

3,247,146
POLYMERIZATION OF MONOMERIC MATERIALS USING A POLYMERIC SOAP WHICH IS A POLYESTER OF A POLYCARBOXYLIC ACID AND A POLYALKYLENE GLYCOL AS AN EMULSIFIER
Grover C. Royston, Baker, La., assignor to Copolymer Rubber & Chemical Corporation, a corporation of Louisiana
No Drawing. Filed Oct. 7, 1963, Ser. No. 314,533
26 Claims. (Cl. 260—27)

This invention broadly relates to a novel process for polymerizing monomeric materials and to the resulting products. In some of its more specific aspects, the invention further relates to the preparation of low solids synthetic polymer latex characterized by a large average particle size as produced, and to the resulting low solids latex which may be concentrated to a high solids content.

The invention may be illustrated and described hereinafter with specific reference to the polymerization of a monomer or a mixture of monomers while dispersed in an aqueous medium under polymerization conditions in the presence of an emulsifying agent and a polymerization catalyst to produce synthetic rubber latex. However, it is understood that latices of synthetic polymers in general may be prepared in accordance with the teachings of the present invention.

In many industrial processes employing synthetic rubber latex, such as in the manufacture of foamed rubber, it is desirable that the latex have certain properties. Among the more important of the desirable properties are a high solids content, such as about 60% t.s.c. (total solids content) or higher and a low viscosity such as less than about 1000 centipoises at 60% t.s.c. Within reasonable limits, latices having higher solids contents and lower viscosities are more desirable. Still another important consideration is the mechanical stability of the latex, and if it does not have a satisfactory mechanical stability, a prohibitive amount of the polymer content may irreversibly coagulate or "prefloc" during handling and storage prior to use. The viscosity of synthetic rubber latex at a given temperature and solids content is largely determined by the average particle size and the distribution of particle size. It is usually accepted that a large average particle size and a wide, uniform distribution of particle sizes are desirable and result in a lower viscosity latex at a given solids content and temperature. As the solids content is increased or the temperature decreased, then the viscosity increases for a given average particle size and distribution of particle sizes and especially at higher solids contents.

Many attempts have been made to prepare satisfactory low viscosity, high solids, synthetic rubber latices. However, great difficulty has been experienced in providing latex having a sufficiently large average particle size and the proper distribution of particle size to result in low viscosity at a high solids content. One method of approaching the problem heretofore has been to first prepare a low solids, small particle size latex by a fast polymerization recipe, agglomerate the latex to a large average particle size by an expensive procedure, and then concentrate the agglomerated latex to a desired high solids content. Still another method has been to prepare a high solids latex directly by employing a polymerization recipe calling for a minimum amount of water, but which requires an extremely long reaction time.

The above mentioned prior art methods of preparing high solids latex have been practiced on a large scale as no satisfactory relatively fast reaction low solids polymerization recipe has been available which is capable of growing large polymer particles with the proper distribution of particle size directly during the polymerization as the latex is produced. Therefore, it has been necessary to resort to an expensive agglomeration step prior to concentration of prior art low solids latex. Slow reaction time polymerization recipes employing a minimum amount of water also have not been entirely satisfactory. The polymerization mixture passes through a very viscous stage during which production problems invariably occur, the reaction is difficult to control, and there are high power requirements for agitation. Additionally, extremely long reaction times of 40 hours or more are necessary, as compared with approximately 10 hours when using a fast reaction recipe, and this has the effect of reducing the capacity of equipment to only a fraction of that which would exist if a fast reaction recipe could be used.

In view of the foregoing, it is apparent that if it were possible to provide a fast reaction, low solids polymerization recipe capable of growing large polymer particles directly, and with a proper distribution of polymer particle size, then the polymerization step could be effected very rapidly and the resulting low solids latex could be concentrated as produced to the desired high solids content without the necessity for an agglomeration step. However, such a recipe was not available prior to the present invention.

It is an object of the present invention to provide a novel process for the polymerization of monomeric materials and the resulting novel polymerization products.

It is a further object to provide a novel process for the preparation of synthetic polymer latex and the resulting novel latices.

It is still a further object to provide a novel process for preparing high solids synthetic polymer latex and the resulting high solids latices.

It is still a further object to provide a novel process for preparing low solids synthetic rubber latex characterized by a large average particle size which may be concentrated to a high solids content as produced and to provide the resulting high solids synthetic rubber latex product.

Still other objects of the invention and the attendant advantages will be apparent to those skilled in the art upon reference to the following detailed description and the examples.

In accordance with one important aspect of the invention, a novel process is provided for the polymerization of suitable monomeric materials while dispersed in an aqueous medium under polymerization conditions in the presence of at least one emulsifying agent and a polymerization catalyst. The process includes incorporating in the aqueous medium so as to be present therein during the polymerization an emulsifying agent comprising a water soluble polymeric soap which is a polyester of an organic acid containing at least three carboxylic acid groups and a polyalkylene glycol. Thereafter, the resulting latex may be concentrated to a desired high solids content following prior art processes for the removal of water therefrom.

While numerous prior art polymerization recipes may be modified and used in accordance with the present invention, it is usually preferred that fast reaction polymerization recipes for the preparation of low solids synthetic polymer latics be used. Examples of such polymerization recipes and the procedures to be followed may be found in a large number of publications and issued United States patents, including the text "Synthetic Rubber," edited by G. S. Whitby, John Wiley and Sons, Inc. (1954), and Carpenter Patent 2,993,020. The polymerization may be conducted in a given instance at low or high temperature depending somewhat upon the the specific polymerization recipe selected, such as at about 50° C. for a "hot rubber" polymerization recipe, and about 5° C. for a "cold rubber" polymerization recipe, and over a suitable period of time to arrive at a desired percent conversion of the monomers, such as about 60–70% by weight. The unreacted monomers then may be stripped from the resulting latex following conventional procedures. When a low solids latex is produced, the total solids content may be, for example, 15–25% by weight.

Whatever the nature of the specific polymerization recipe selected, it is understood that the prior art processing steps and procedures may be practiced, if desired, with the exception of substituting the polymeric soap to be described more fully hereinafter in the recipe as an emulsifying agent, or as a component of the emplsifying agent. Fast reaction, low solids recipes having reaction times less than 24 hours, such as 8–12 hours, are usually preferred when practicing the invention.

Examples of polymerizable materials for use in preparing synthetic polymer latices are well known and described in numerous publications, such as the aforementioned publications, and include the various 1,3-butadienes such as 1,3-butadiene, methyl-2-butadiene-1,3, piperlyene, 2,3-dimethyl butadiene-1,3 and chloroprene. If desired, the polymerizable monomeric material may be a mixture of 1,3-butadiene with another monomer copolymerizable therewith. For example, the polymerizable monomeric material may be a mixture of a 1,3-butadiene and a compound which contains a $CH_2=C=$ group, wherein at least one of the disconnected valences is attached to an electroactive group, i.e., a group which substantially increases the electrical dissymmetry or polar character of the molecule. Examples of compounds containing the aforementioned group and copolymerizable with the 1,3-butadienes are the aryl olefins such as styrene and vinyl naphthalene; the alphamethylene carboxylic acids and their esters, nitriles and amides, such as acrylic acid, methyl acrylate, methyl methacrylate, acrylonitrile, methacrylonitrile and methacrylamide; isobutylene; methylvinylether; and methylvinylketone. In instances where latex of a synthetic rubber is to be prepared, the polymerizable monomeric material may contain one or more of the 1,3-butadienes, or a mixture thereof containing up to 50% (or higher in some instances) of a compound which contains the $CH_2=C=$ group. In instances where latex of a resinous polymer is to be prepared, the polymerizable monomeric material may be a mixture containing more than 50% of a compound having the $CH_2=C=$ group, and in some instances it may consist of one or more compounds containing the aforementioned group such as when preparing polystyrene by polymerization of styrene monomer. In many instances, the preferred polymerizable material is a mixture of butadiene and styrene whereby a copolymer of styrene and butadiene is produced, and in instances where a rubbery copolymer is desired, the mixture should contain less than about 50% by weight of styrene.

Suitable catalysts for use in the aqueous emulsion polymerization of the foregoing polymerizable monomeric materials are likewise disclosed and described in numerous publications, including those above mentioned. Similarly, prior art primary emulsifying agents such as water soluble long chain fatty acid soaps and rosin soaps, and secondary emulsifiers such as polymerized sodium salts of alkyl naphthalene sulfonic acid are also disclosed.

The polymeric soap of the invention for use as an emulsifier in the polymerization recipes described herein is a polyester of an organic acid containing at least three carboxylic acid groups and a polyalkylene glycol. Examples of organic acids containing at least three carboxylic acid groups include the cyclopentanetetracarboxylic acids and pyromellitic acid. However, other suitable tri, tetra, penta, and higher carboxylic acids may be employed. Usually, 1,2,3,4-cyclopentanetetracarboxylic acid is preferred and especially the cis,cis,cis,cis-stereoisomer thereof. The alkylene groups of the polyalkylene glycol may contain, for example, 2 through 8 carbon atoms and preferably 2 through 4 carbon atoms. Examples of polyalkylene glycols which are especially useful include polyethylene glycol and polypropylene glycol. The molecular weight of the polyalkylene glycols should be at least 1000 for good results and often better results are obtained when the molecular weight is about 2000. A higher molecular weight may be desirable in some instances, such as from 4–6,000 to 8–10,000.

The polymeric soaps may be prepared by the polyesterification of organic acids containing at least three carboxylic acid groups and polyalkylene glycol as described herein following prior art polyesterification procedures. The ratio of reactants is such so as to produce a polyester containing free carboxylic acid groups which may be saponified with a soap-forming base to produce a water soluble soap. Usually, it is preferred that approximately equimolar quantities of the organic acid and the polyalkylene glycol be used so as to assure the preparation of a linear polyester which contains a maximum number of free carboxylic acid groups. However, the ratio of the reactants may be varied provided sufficient free carboxylic acid groups are present for saponification with base to produce a water soluble soap.

The polyester may be prepared following prior art polyesterification techniques by polymerizing the polyalkylene glycol and the free organic acid or a derivative thereof such as an anhydride of the organic acid. Usually it is preferred that an anhydride of the organic acid be used as the polymerization proceeds more readily but other derivatives of the organic acid may be used which react with the free hydroxyl groups of the polyalkylene glycol to produce a polyester. The dianhydride of 1,2,3,4-cyclopentanetetracarboxylic acid often gives the best results. The term "polyester of an organic acid containing at least three carboxylic acid groups and a polyalkylene glycol" which may appear in the specification and claims is understood to include polyesters containing the above organic acid nucleus and the polyalkylene glycol nucleus, regardless of how prepared and whether the free organic acid, an anhydride derivative, or other suitable derivative thereof is actually used in the preparation of the polyester.

If desired, an esterification catalyst may be present during the polyesterification such as p-toluene sulfonic acid, benzyldimethylamine and tripropylamine. The polyesterification may be conducted in the presence or absence of an inert solvent, or in the presence or absence of a catalyst. However, the reaction rate may be slower in an inert solvent and/or in the absence of a catalyst. Usually it is preferred that a mixture of the organic acid and polyalkylene glycol be esterified in the presence of a catalyst at elevated temperatures such as 100–200° C. or higher for a period of 3–10 hours.

The acidic polyester contains free carboxylic acid groups as prepared and it is then treated with a base such as ammonia, ammonium hydroxide, sodium hydroxide or potassium hydroxide. It is preferred that the polyester be contacted with an excess of base over that theoretically required to saponify the free carboxylic acid groups, and with sufficient water to prepare a solution of the resulting soap. Surprisingly, very concentrated soap solutions may be prepared that contain 20–30% by weight or more of the polymeric soap. These are much higher concentrations than are normally possible with soaps of the long chain fatty acids or rosin acids.

The polymeric soap may be substituted for the primary emulsifier in the prior art polymerization recipes described herein in a desired quantity. It is preferred that only a portion of the primary emulsifier content be replaced, and that a mixture of the prior art primary emulsifier and the polymeric soap be used. The mixture may contain about 20–80 parts by weight of the polymeric soap for each 80–20 parts by weight of the prior art primary emulsifier. For example, in instances where the prior art primary emulsifier of the polymerization recipe is a water soluble long chain fatty acid soap or a water soluble rosin soap, then the primary emulsifier in accordance with the invention may contain 20–80 parts by weight of the polymeric soap and 80–20 parts by weight of the long chain fatty acid soap or rosin soap. Examples of long chain fatty acid soaps include the ammonium, sodium or potassium soaps of lauric, myristic, palmitic and oleic acids, and rosin soaps include the ammonium, sodium and potassium soaps of the rosin acids, including the disproportionated rosin acids. In most instances, it is usually preferred that the mixture contain about 1 part by weight of the polymeric soap for each part by weight of the fatty acid soap or rosin soap.

After substituting the polymeric soap of the invention in a prior art polymerization recipe, the polymerization may proceed following the usual prior art practice to produce latex of the synthetic polymer. The resulting latex has a substantially larger average polymer particle size as prepared than similar latex prepared with the prior art emulsifier, and the distribution of polymer particle sizes is such so as to allow low solids latex to be concentrated to a high solids content without encountering a prohibitively high viscosity. In most instances, the average polymer particle size of low solids latex as prepared may be increased from about 700–900 Angstroms up to as high as 2500 Angstroms or higher. The marked increase in particle size is accompanied by an excellent distribution of particle size which, in combination, assure a low viscosity upon concentration to a high solids content. As a result, it is possible to prepare a high solids latex containing at least 60% by weight of total solids with a viscosity of 1000 centipoises or less, and often as low as 300–400 centipoises.

The low solids latices prepared in accordance with the present invention are stable and may be stripped free of monomer following the polymerization step by prior art practices and concentrated to a high solids content. However, it is usually preferred that not more than 80% by weight of the primary emulsifier be replaced by the polymeric soap of the invention as at higher percentages more prefloc is produced. The concentration of the low solids latices may be effected by a thermal concentration step in which water is evaporated therefrom, preferably under vacuum, creaming, centrifuging, or by other suitable prior art methods of removing water from the latex.

The foregoing detailed description and the following specific examples are for purposes of illustration only and are not intended as being limiting to the spirit or scope of the appended claims.

EXAMPLE I

To a 500 ml. three-necked flask fitted with stirrer, thermometer, elemental nitrogen inlet tube and reflux condenser was added 21.0 g. (0.1 mole) of cis,cis,cis,cis-1,2,3,4-cyclopentanetetracarboxylic dianhydride (CPDA) and 194.5 g. (0.1 mole) of Niax Diol 2025, a polypropylene glycol with a molecular weight of approximately 2000 marketed by Union Carbide Chemicals Co. The mixture was stirred and heated at 200° C. for 7¾ hours to produce an acidic linear polyester containing free carboxylic acid groups and having an acid number of 58. The viscous polymer was treated with an excess of aqueous KOH to saponify the free carboxylic acid groups and prepare a very fluid solution containing 29.6% of the resulting polymeric potassium soap as determined by conductimetric titration with standard HCl. The polymeric soap was tested as an emulsifier in the recipe for preparing a copolymer of butadiene and styrene shown below:

| Ingredient: | Parts by weight |
|---|---|
| Butadiene | 70.00 |
| Styrene | 30.00 |
| Soap (primary emulsifier) | variable |
| Secondary emulsifier [1] | 0.20 |
| Sodium formaldehyde sulfoxylate | 0.02 |
| Activator solution [2] | 0.01 |
| KCl | 0.30 |
| Tertiarydodecylmercaptan | 0.20 |
| Paramenthane hydroperoxide | 0.06 |
| Water _____(total) | 200.00 |

[1] Polymerized sodium salt of alkyl sulfonic acid (marketed by Dewey and Almy, division of W. R. Grace Co., as Daxad. 15).
[2] The activator was a solution of 1.27 grams of sodium hydroxide, 2.31 grams of the tetrasodium salt of ethylenediamine tetraacetic acid and 2.0 grams of ferrous sulfate heptahydrate in water made up to 100 ml.

Several latices were prepared using the above recipe. The polymerization conditions and the recipe ingredients were identical in each run with the exception of the soap content, which was varied between 4.5 parts by weight by potassium oleate and none of the polymeric soap to 0.5 part by weight of potassium oleate and 4.0 parts by weight of the polymeric soap. The polymerization was terminated after 10¼ hours and the polymerization temperature was 50° C. in all runs. The latices were stripped of unreacted butadiene and styrene monomers, and tested following conventional procedures to determine the percent prefloc, the final total solids content and the average polymer particle size in angstroms. All of the latices were stable upon stripping of the unreacted monomers and were mechanically stable subsequent to the stripping.

The following results were obtained:

*Table I*

| Run | Soap, Parts by Weight | | Final Total Solids, Percent | Prefloc, g. | Average Particle Size, A. |
|---|---|---|---|---|---|
| | Potassium Oleate | Polymeric | | | |
| 1 | 4.5 | 0 | 20.3 | none | 812 |
| 2 | 3.5 | 1.0 | 25.8 | none | 1,345 |
| 3 | 2.5 | 2.0 | 22.8 | none | 1,774 |
| 4 | 2.25 | 2.25 | 23.0 | none | 1,630 |
| 5 | 1.5 | 3.0 | 23.0 | none | 1,994 |
| 6 | 0.5 | 4.0 | 12.6 | 0.7 | 1,792 |

It is apparent from the above data that polymerization in the presence of the polymeric soap of the invention results in an increase in the average particle size of the latex from 812 angstroms to 1994 angstroms.

EXAMPLE II

The procedure followed in this example was the same as that of Example I for Run 4 in which 2.25 parts each of potassium oleate and the polymeric soap were used. The following results were obtained:

*Table II*

| Run | Final Solids, Percent | Prefloc | Prefloc on Stripping |
|---|---|---|---|
| 1 | 28.1 | none | none |
| 2 | 25.2 | none | none |
| 3 | 25.4 | none | none |

A blend of the above latices had an average particle size of 2460 A. This latex blend, on thermal concentration to remove sufficient water to give a 62% total solids content, had a Brookfield viscosity of only 400 centipoises.

EXAMPLE III

The procedure of this example followed that of Example I, except as noted hereinafter.

A polyester was prepared from equimolar quantities of CPDA and Niax Diol 2025. The nitrogen flow rate was adjusted to 180 cc./minute and the agitation was at 900 r.p.m. using a blade with a radius of 5/8". The Niax Diol 2025 (194.5 g.) was heated at 200° C.∓1° C. for 15 minutes to remove absorbed moisture. Then 0.2 g. of 90% p-toluenesulfonic acid was added along with 21.0 g. (0.1 mole) of CPDA. Reaction was continued for 2¾ hours at 200° C. to give a linear polyester having an acid number of 54. The polymer was saponified with aqueous KOH to give a very fluid solution containing 24.2% of the resulting polymeric potassium soap.

Styrene-butandiene rubber latex was prepared in a series of runs using the receipe of Example I while varying the polymeric soap content as noted in Table III. Reaction at 50° C. gave the large particle latices listed in Table III below:

*Table III*

| Run | Soap, Parts by Weight | | Final Total Solids, Percent | Prefloc, g. | Average Particle Size, A. |
|---|---|---|---|---|---|
| | Potassium Oleate | Polymeric | | | |
| 1 | 4.5 | 0 | 23.7 | none | 920 |
| 2 | 3.5 | 1.0 | 27.6 | none | 1,465 |
| 3 | 2.5 | 2.0 | 24.0 | none | 2,130 |
| 4 | 2.25 | 2.25 | 24.0 | none | 2,270 |
| 5 | 1.5 | 3.0 | 23.6 | none | 2,300 |

The above latices were all mechanically stable.

What is claimed is:

1. In a process for the polymerization of polymerizable monomeric material selected from the group consisting of chloroprene monomer, at least one conjugated diolefin monomer, and mixtures of at least one of said monomers with at least one monoethylenically unsaturated comonomer copolymerizable therewith while dispersed in an aqueous medium under polymerization conditions in the presence of at least one emulsifying agent and a polymerization catalyst whereby latex of the resulting polymer is produced, the improvement which comprises employing in said aqueous medium during the polymerization of the monomeric material an emulsifying agent comprising a water soluble polymeric soap which is a polyester of an organic acid containing at least three carboxylic acid groups and a polyalkylene glycol, the polyester containing a plurality of saponified carboxylic acid groups.

2. The latex prepared by the process of claim 1.

3. The process of claim 1 wherein the polymeric soap is a polyester of a cyclopentanetetracarboxylic acid and a polyalkylene glycol.

4. The process of claim 1 wherein the alkylene groups of the polyalkylene glycol contain 2 through 4 carbon atoms.

5. The process of claim 1 wherein the polymeric soap is a polyester of a cyclopentanetetracarboxylic acid and a polyalkylene glycol, the alkylene groups of the polyalkylene glycol containing 2 through 4 carbon atoms.

6. In a process for the polymerization of a polymerizable mixture of butadiene monomer and styrene monomer while dispersed in an aqueous medium under polymerization conditions in the presence of at least one emulsifying agent and a polymerization catalyst whereby latex of a copolymer of butadiene and styrene is produced, the improvement which comprises employing in said aqueous medium during the polymerization of the mixture of butadiene monomer and styrene monomer an emulsifying agent comprising a water soluble polymeric soap which is a polyester of an organic acid containing at least 3 carboxylic acid groups and a polyalkylene glycol, the polyester containing a plurality of saponified carboxylic acid groups.

7. The latex of the copolymer of butadiene and styrene prepared by the process of claim 6.

8. The process of claim 6 wherein the polymeric soap is a polyester of a cyclopentanetetracarboxylic acid and a polyalkylene glycol.

9. The process of claim 6 wherein the alkylene groups of the polyalkylene glycol contain 2 through 4 carbon atoms.

10. The process of claim 6 wherein the polymeric soap is a polyester of a cyclopentanetetracarboxylic acid and a polyalkylene glycol, the alkylene groups of the polyalkylene glycol containing 2 through 4 carbon atoms.

11. The process of claim 6 wherein the water soluble polymeric soap is a linear polyester of 1,2,3,4-cyclopentanetetracarboxylic acid and polyethylene glycol, the polyethylene glycol having a molecular weight of at least 1000.

12. The process of claim 6 wherein the water soluble polymeric soap is a linear polyester of 1,2,3,4-cyclopentanetetracarboxylic acid and polypropylene glycol, the polypropylene glycol having a molecular weight of at least 1000.

13. In a process for the polymerization of polymerizable monomeric material selected from the group consisting of chloroprene monomer, at least one conjugated diolefin monomer, and mixtures of at least one of said monomers with at least one monoethylenically unsaturated comonomer copolymerizable therewith while dispersed in an aqueous medium under polymerization conditions in the presence of at least one emulsifying agent and a polymerization catalyst, the improvement which comprises employing in said aqueous medium during the polymerization of the monomeric material as an emulsifying agent a mixture comprising a water soluble polymeric soap which is a polyester of an organic acid containing at least three carboxylic acid groups and a polyalkylene glycol and soap selected from the group consisting of water soluble long chain fatty acid soaps and water soluble rosin soaps, the polyester containing a plurality of saponified carboxylic acid groups.

14. The process of claim 13 wherein there is employed in said aqueous medium as an emulsifying agent a mixture comprising 20–80 parts by weight of a water soluble polymeric soap which is a polyester of cyclopentanetetracarboxylic acid and a polyalkylene glycol for each 80–20 parts by weight of soap selected from the group consisting of water soluble long chain fatty acid soaps and water soluble rosin soaps.

15. The process of claim 13 wherein the alkylene groups of the polyalkylene glycol contain 2 through 4 carbon atoms.

16. The process of claim 13 wherein there is employed in said aqueous medium as an emulsifying agent a mixture comprising 20–80 parts by weight of water soluble polymeric soap which is a polyester of 1,2,3,4-cyclopentanetetracarboxylic acid and a polyalkylene glycol for each 80–20 parts by weight of soap selected from the group consisting of water soluble long chain fatty acid soaps and water soluble rosin soaps, the alkylene groups of the polyalkylene glycol containing 2 through 4 carbon atoms.

17. In a process for the polymerization of a polymerizable mixture of butadiene monomer and styrene monomer while dispersed in an aqueous medium under polymerization conditions in the presence of at least one emulsifying agent and a polymerization catalyst to produce a copolymer of butadiene and styrene, the improvement which comprises employing in said aqueous medium during the polymerization of the mixture of butadiene monomer and styrene monomer as an emulsifying agent a mixture comprising a water soluble polymeric soap which is a polyester of an organic acid containing at least 3 carboxylic acid groups and a polyalkylene glycol and soap selected from the group consisting of water soluble long chain fatty acid soaps, the polyester containing a plurality of saponified carboxylic acid groups and water soluble rosin soaps.

18. The process of claim 17 wherein there is employed in said aqueous medium as an emulsifying agent a mixture comprising 20–80 parts by weight of water soluble polymeric soap which is a polyester of cyclopentanetetracarboxylic acid and a polyalkylene glycol for each 80–20 parts by weight of soap selected from the group consisting of water soluble long chain fatty acid soaps and water soluble rosin soaps.

19. The process of claim 17 wherein the alkylene groups of the polyalkylene glycol contain 2 through 4 carbon atoms.

20. The process of claim 17 wherein there is employed in said aqueous medium as an emulsifying agent a mixture comprising 20–80 parts by weight of water soluble polymeric soap which is a linear polyester of 1,2,3,4-cyclopentanetetracarboxylic acid and a polyalkylene glycol for each 80–20 parts by weight of soap selected from the group consisting of wtaer soluble long chain fatty acid soaps and water soluble rosin soaps, the alkylene groups of the polyalkylene glycol containing 2 through 4 carbon atoms.

21. The process of claim 17 wherein there is employed in said aqueous medium as an emulsifying agent a mixture comprising about one part by weight of water soluble polymeric soap which is a linear polyester of cis, cis, cis, cis-1,2,3,4-cyclopentanetetracarboxylic acid and polyethylene glycol for each part by weight of water soluble long chain fatty acid soap, the polyethylene glycol having a molecular weight of about 2000.

22. The process of claim 17 wherein there is employed in said aqueous medium as an emulsifying agent a mixture comprising about one part by weight of water soluble polymeric soap which is a linear polyester of cis, cis, cis, cis-1,2,3,4-cyclopentanetetracarboxylic acid and polypropylene glycol for each part by weight of water soluble long chain fatty acid soap, the polypropylene glycol having a molecular weight of about 2000.

23. A process for preparing high solids latex consisting essentially of the steps of polymerizing polymerizable monomeric material selected from the group consisting of chloroprene monomer, at least one conjugated diolefin monomer, and mixtures of at least one of said monomers with at least one monoethylenically unsaturated comonomer copolymerizable therewith while dispersed in an aqueous medium under polymerization conditions in the presence of an emulsifying agent and a polymerization catalyst whereby low solids latex of the resulting polymer is produced, the empulsifying agent being present in the aqueous medium during the polymerization of the monomeric material and comprising a water soluble polymeric soap which is a polyester of an organic acid containing at least three carboxylic acid groups and a polyalkylene glycol, the polyester containing a plurality of saponified carboxylic acid groups and the latex as produced having a large average particle size, and then concentrating the latex to a high solids content to produce high solids latex.

24. The high solids latex prepared by the process of claim 23.

25. A process for preparing high solids latex consisting essentially of the steps of polymerizing a polymerizable mixture of butadiene monomer and styrene monomer while dispersed in an aqueous medium under polymerization conditions in the presence of at least one emulsifying agent and a polymerization catalyst whereby low solids latex of a copolymer of butadiene and styrene is produced, the emulsifying agent being present in the aqueous medium during the polymerization of the mixture of butadiene monomer and styrene monomer and comprising a water soluble polymeric soap which is a polyester of an organic acid containing at least 3 carboxylic acid groups and a polyalkylene glycol, the polyester containing a plurality of saponified carboxylic acid groups and the latex as produced having a large average particle size, and then concentrating the latex to a high solids content to produce high solids latex, the high solids latex having a viscosity not greater than 1000 centipoises at a total solids content of 60% by weight.

26. The latex of the copolymer of butadiene and styrene prepared by the process of claim 25.

References Cited by the Examiner

UNITED STATES PATENTS

| | | | |
|---|---|---|---|
| 2,512,697 | 6/1950 | Te Grotenhuis | 260—29.7 |
| 2,786,785 | 3/1957 | Wise | 260—873 |
| 2,939,857 | 6/1960 | Bolton et al. | 260—75 |
| 3,021,308 | 2/1962 | Caywood, Jr. et al. | 260—75 |
| 3,022,262 | 2/1962 | Hyde | 260—844 |
| 3,068,196 | 12/1962 | Gordon | 260—845 |

MURRAY TILLMAN, *Primary Examiner.*